J. FOWLER.
HAY PRESS.
APPLICATION FILED JUNE 12, 1908.

918,524.

Patented Apr. 20, 1909.
3 SHEETS—SHEET 1.

Witnesses
James F. Crown
M. L. Skinner

Inventor
James Fowler
By Watson E. Coleman
Attorney

J. FOWLER.
HAY PRESS.
APPLICATION FILED JUNE 12, 1908.
918,524.
Patented Apr. 20, 1909.
3 SHEETS—SHEET 2.
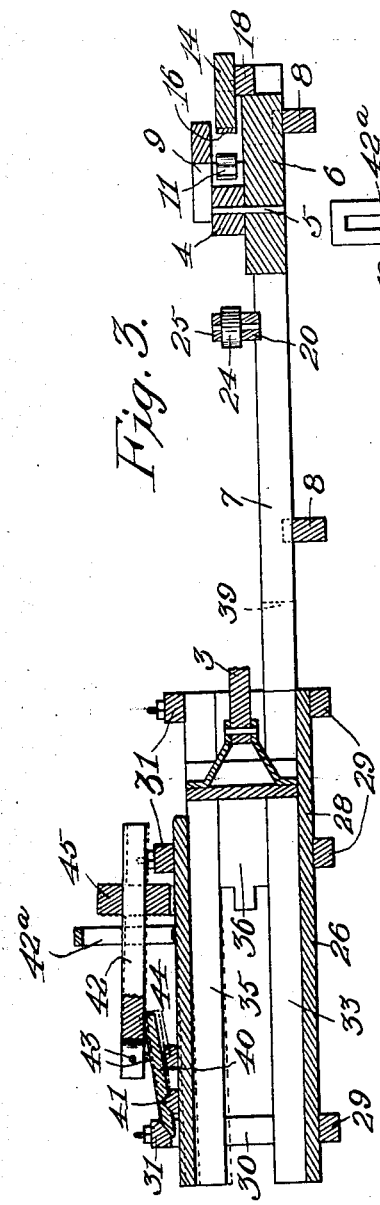
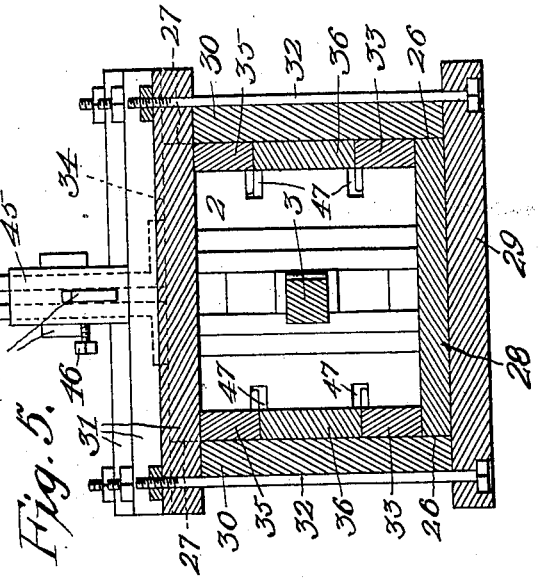
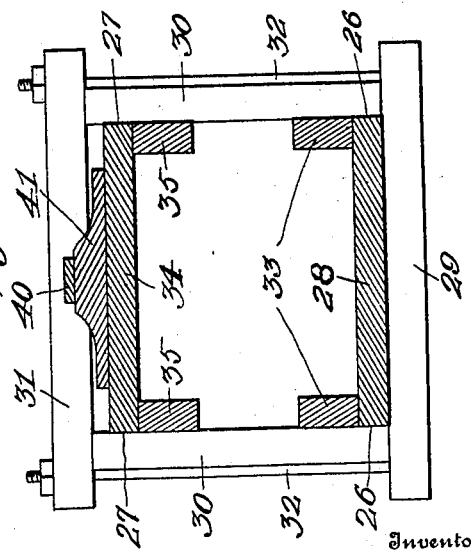
Witnesses
James F. Crown
M. L. Skinner
Inventor
James Fowler
By Watson E. Coleman
Attorney

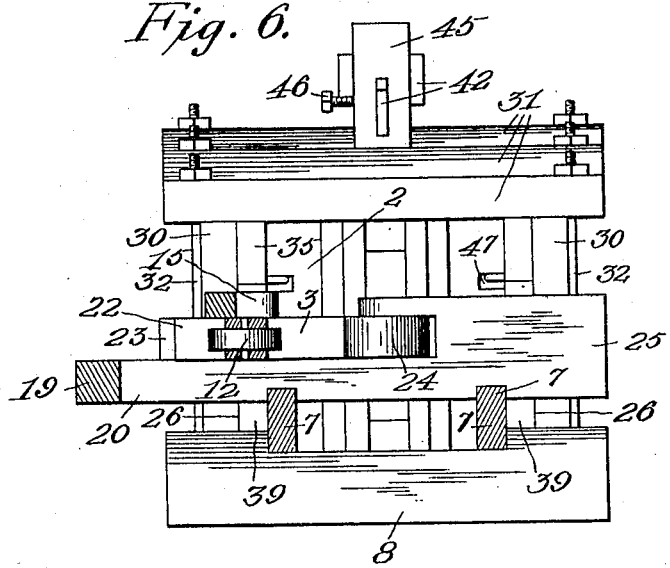

UNITED STATES PATENT OFFICE.

JAMES FOWLER, OF SOPERTON, GEORGIA.

HAY-PRESS.

No. 918,524.　　　　Specification of Letters Patent.　　　Patented April 20, 1909.

Application filed June 12, 1908. Serial No. 438,225.

*To all whom it may concern:*

Be it known that I, JAMES FOWLER, a citizen of the United States, residing at Soperton, in the county of Montgomery and State of Georgia, have invented certain new and useful Improvements in Hay-Presses, of which the following is a specification, reference being had to the accompanying drawings.

My invention relates to improvements in presses for baling hay and the like.

One object of the invention is to provide an improved cam device for actuating the plunger of the press.

Another object of the invention is to provide means for regulating the weight of the bales formed by the press.

A further object of the invention is to provide improved spring devices for preventing the hay from following the plunger upon its return stroke.

With the above and other objects in view, the invention consists of the novel features of construction and the combination and arrangement of parts hereinafter fully described and claimed, and illustrated in the accompanying drawings, in which—

Figure 1:
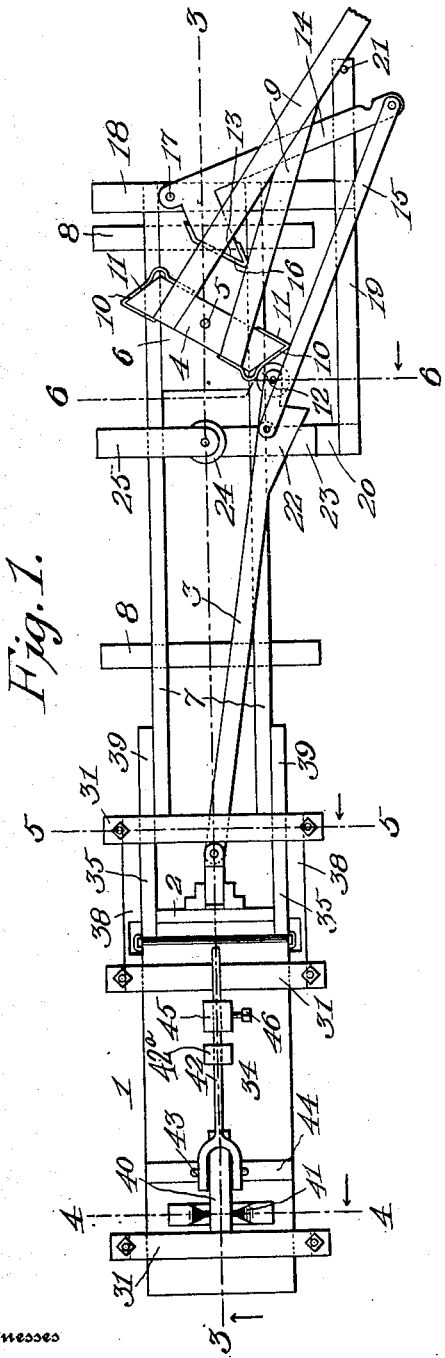
Figure 2:
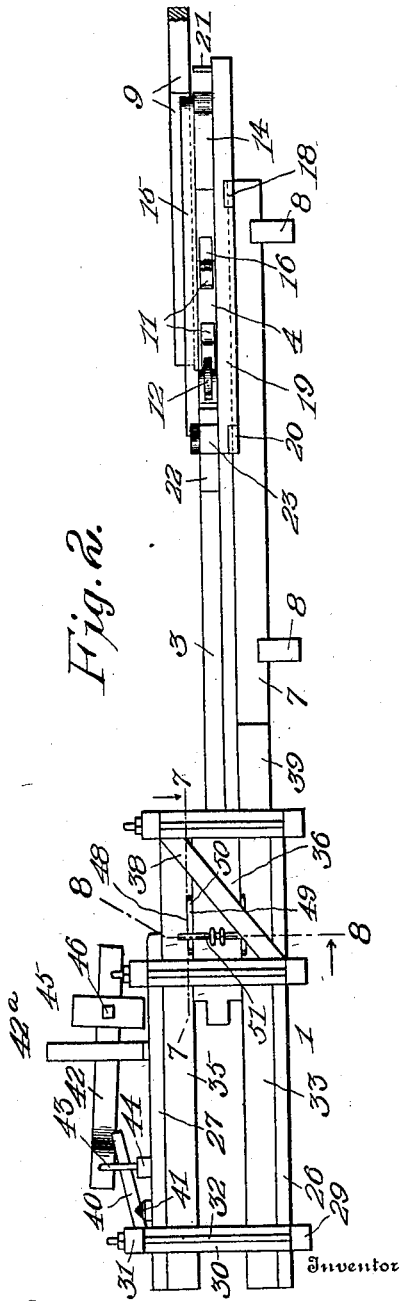

Figure 1 is a plan view of my improved baling press; Fig. 2 is a side elevation; Fig. 3 is a vertical longitudinal section taken on the plane indicated by the line 3—3 in Fig. 1; Figs. 4, 5 and 6 are vertical transverse sections taken, respectively, on the planes indicated by the lines 4—4, 5—5, and 6—6 in Fig. 1; Fig. 7 is a detail horizontal section taken on the plane indicated by the line 7—7 in Fig. 2; and Fig. 8 is a vertical cross section on the plane of the springs for actuating the stop members in the bale chamber.

In the drawings 1 denotes the baling chamber, 2 the plunger which reciprocates therein and which has a rod 3 actuated by my improved cam device. The latter comprises a double cam head or block 4 rotatably mounted on a vertical pivot 5 projecting from a supporting block or base 6 arranged between parallel longitudinal beams 7, which latter are supported upon one or more transverse beams or sills 8 and have their forward ends connected to the baling chamber or body of the press. The cam 4 has a sweep beam 9 connected to it and its opposite ends are beveled in opposite directions to provide cams. These beveled ends or cams 10 are preferably faced with metal wear plates 11 when the cam block 4 is constructed of wood, and in the latter case the centrally arranged opening in the cam block for the pivot 5 is also provided with a metal bushing. The wear plates 11 are in the form of flat metal plates bent around the ends of the cam block and at the obtuse angled corner of each of said ends the plate is bent to provide a curved enlargement, as clearly shown in Fig. 1. The cams 10, as the block or head 4 is rotated, are adapted to successively engage an anti-friction roller 12 journaled in the bifurcated rear end of the plunger rod 3, and to force the latter forwardly to cause the plunger 2 to compress the material in the baling chamber. The cams 10 are also adapted to successively engage and actuate a cam projection 13 upon a lever 14 which is pivoted at one end and has its free end connected by a link 15 to the plunger rod 3. The cam 13 is in the form of a block or enlargement projecting laterally from one side of the lever 14, adjacent to its pivoted end, and having an inclined or cam face covered by a metal wear plate 16. Said lever 14 is mounted upon a vertical pivot 17 upon a transverse beam 18 extending across the longitudinal beams or sills 7 and connected by a longitudinal beam 19 to a similar transverse beam 20 arranged upon the beams 7 on the opposite side of the pivot 5. The beams 18, 19, 20 form a supporting frame for the lever 14 and the rear end of the plunger rod 3 and upon the extended rear end of the beam 19 is a stop pin 21 which serves to limit the rearward swinging movement of the lever 14, and hence the return stroke of the plunger. The plunger rod 3 is adapted to have lateral or horizontal swinging movement and in order to guide it toward the center or longitudinal axis of the press when one of the cams 10 moves it in a forward direction, I provide upon one side of its rear end a cam projection 22 adapted to engage a guide or stop block 23 secured to the beam 20. The cam 22 has an outwardly and rearwardly inclined outer face which engages the guide 23 and when the plunger rod is forced inwardly or forwardly causes the rear end of the latter to move toward the center of the press. An anti-friction roller 24 is journaled in a bearing block 25 upon the beam 20 and is adapted to engage the opposite side of the plunger rod 3 to guide the latter in its inward movement.

The baling chamber or body 1 of the press comprises lower and upper members 26, 27 so shaped as to form the chamber between them and being so connected at one end that their opposite or outer ends may be adjusted toward and from each other to vary the size of the chamber formed between them. As illustrated, the lower member or section 26 is stationary and comprises a horizontal base 28 which forms the bottom of the press and which is secured upon three or more transverse beams or sills 29 each of which latter forms the base of an upright rectangular frame having upright side beams 30 rising from the beams 29 and united at their top by cross beams 31, said upright frames surrounding the two members 26, 27 of the baling chamber or body 1 and being strengthened by upright metal tie rods 32 arranged between the beams 29, 31 and adjacent to the uprights 30. The lower member 26 also comprises two longitudinal side strips 33 arranged at the edges of the bottom 28 and adapted to form the lower portions of the sides of the baling chamber. The upper member 27 comprises a horizontal portion 34 which forms the top of the baling chamber and which has depending from its side edges longitudinal strips 35 forming the upper portions of the sides of the baling chamber or body. The strips 35 have their inner ends extended beyond the inner end of the top 34 and united to the corresponding portions of the strips 33 by longitudinal spacing strips or plates 36 which close the space between the strips 33, 35 at the inner end of the body 1 or at points between the two inner upright frames. The latter are preferably connected together by diagonal braces 38, which braces also connect the adjacent portions of the strips 33, 35, 36, as clearly shown in Fig. 2. By making the top 34 of less length than the strips 35 the inner end of the body 1 has an open portion at its top into which the hay or other material to be baled, is thrown in advance of the plunger 2. The inner ends of the side strips 33 are preferably extended beyond the inner or rearmost upright frame, as shown at 39, and the inner ends of the beams 7 are detachably bolted to them so that the plunger actuating mechanism may be readily connected or disconnected from the body of the press.

In order to control the weight of the bale formed within the body or chamber 1, I provide means for springing the outer portion of the upper member 27 of said body downwardly to reduce the size of the baling chamber. As illustrated, this means comprises a lever 40 fulcrumed upon a block 41 on the top 34 and having one end arranged under the cross beam 31 of the outermost upright frame and its opposite end engaged by a regulating lever 42. The lever 40 is preferably removably mounted by forming in its bottom intermediate its ends a transverse groove to receive a pivot rib or projection upon the top of the block 41. The regulating or controlling lever 42 has one of its ends forked and apertured to receive pivots upon upright pivot brackets 43 arranged on opposite sides of the lever 40 and rising from a transverse beam 44 upon the top 34. The intermediate portion of the lever 42 bears upon the end of the lever 40 and any suitable means may be provided for retaining the free end of the lever 42 in an adjusted position so as to actuate the member 27 of the body 1 downwardly to the desired extent. As illustrated, a weight 45 is slidably mounted on the free end of the lever 42 and adapted to be secured in an adjusted position by means of a set screw 46. It will be seen that by adjusting this weight upon the lever the pressure upon the movable member or section 27 of the body 1 may be varied as desired and, consequently, the pressure placed upon the bale by the plunger 2 may be regulated and controlled so that the bale will have the desired weight. 42$^a$ denotes a guide for the lever 42 in the form of an upright arranged upon the top of the bale chamber and having a vertical opening in which the lever is adapted to swing. This guide also limits the upward movement of the lever and prevents it from swinging upon its pivot.

The plunger 2 may be of any suitable form and construction and connected to the forward end of the plunger rod 3 in any suitable manner. As illustrated, said plunger 2 has its side edges formed with notches or recesses 47 arranged opposite longitudinal slots 48 formed between the strips 33, 36, 35 and adapted to receive horizontally swinging stop members 49 which serve to prevent the hay from following the plunger when the latter moves rearwardly upon its return stroke. These stops 49 are angular in shape and are pivoted at their small ends, as shown at 50, and have one side of their large ends engaged with springs 51, which latter project their other sides into the baling chamber. Said stops are preferably constructed of metal rods, as shown in Fig. 7, and two of them are provided upon each side of the press so that a single leaf spring may be secured upon the strip 36, so that its two ends will form the springs 51, as will be readily understood upon reference to Figs. 2 and 7.

In operation, the plunger 2 will be reciprocated as the sweep 9 is rotated. As the sweep 9 is rotated one of the cams 10 will engage the roller 12 on the rear end of the plunger rod 3 and force the latter forwardly so that the plunger will compress the hay within the baling chamber, the parts 22, 23, 24 guiding the plunger rod as it is actuated forwardly. When said cam 10 disengages the roller 12 the other cam 10 on the block or head 4 will engage the cam 13 on the lever 14 so that the latter will be swung rearwardly and cause the link 15 to draw the plunger rod 3 rearwardly and retract the plunger so that shortly after the last mentioned cam 10 leaves the cam 13 it will engage the anti-friction roller 12 to move the plunger 2 forwardly again. It will be seen, therefore, that by providing the two cams upon the sweep and the lever and link connection for the plunger rod, the latter will be reciprocated or retracted as well as projected without the use of springs or other automatic retracting devices. By adjusting the weight 45 longitudinally upon the controlling lever 42 the desired number of pounds of pressure may be placed upon the movable member 27 of the baling chamber or body so that the operator by observing the lever can ascertain when the plunger has compressed the bale to the desired density and weight.

While I have shown and described in detail the preferred embodiment of my invention I wish it understood that I do not limit myself to the precise construction set forth and that various changes in the form, proportion and minor details may be resorted to without departing from the spirit or sacrificing any of the advantages of the invention.

Having thus described my invention what I claim is:

1. In a baling press, the combination of a bale chamber, a reciprocatory plunger therein, a plunger rod pivoted at one end to the plunger and formed at its other end upon one side with the laterally projecting cam 22, an anti-friction roller upon the last mentioned end of the plunger rod, a cam beam carrying a sweep and pivoted intermediate its ends, its ends being provided with the angular cams 10 to engage said roller, a lever pivoted at one end and formed adjacent to said end with the lateral projection 13 having a cam end adapted to be engaged and actuated by the cam ends 10 of the cam beam, a link connecting the free end of said lever to the outer end of the plunger rod, the stop 23 to engage the cam 22 on one side of the plunger rod, and the anti-friction roller 24 to engage the other side of the plunger rod.

2. In a baling press, the combination of a chamber having a stationary bottom member and a movable top member, movable toward and from the bottom member, a rigid frame surrounding said members and secured to the bottom member, the transverse block upon the top member provided with the pivot rib 41, the lever 40 notched upon its bottom intermediate its ends to receive said rib and having one end engaged with the rigid frame, the upright pivot brackets 43 rising from the top member on opposite sides of the lever 40, the lever 42 having a forked end mounted on the pivot brackets 43 and its intermediate portion bearing upon the lever 40, the guide 42ª for the lever 42, and an adjustable weight upon the free end of the lever 42.

In testimony whereof I hereunto affix my signature in the presence of two witnesses.

JAMES FOWLER.

Witnesses:
JOHN C. MEADOWS,
W. W. WADE.